(12) United States Patent  
Takasu et al.

(10) Patent No.: US 9,273,684 B2  
(45) Date of Patent: Mar. 1, 2016

(54) HERMETIC ELECTRIC COMPRESSOR

(75) Inventors: Yogo Takasu, Tokyo (JP); Yoshiyuki Kimata, Tokyo (JP); Masanari Uno, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 487 days.

(21) Appl. No.: 13/698,158

(22) PCT Filed: Oct. 4, 2011

(86) PCT No.: PCT/JP2011/072821  
§ 371 (c)(1),  
(2), (4) Date: Nov. 15, 2012

(87) PCT Pub. No.: WO2012/053347  
PCT Pub. Date: Apr. 26, 2012

(65) Prior Publication Data  
US 2013/0057120 A1 Mar. 7, 2013

(30) Foreign Application Priority Data  
Oct. 19, 2010 (JP) ................. 2010-234864

(51) Int. Cl.  
*H02K 11/00* (2006.01)  
*H02K 3/32* (2006.01)  
(Continued)

(52) U.S. Cl.  
CPC ............... *F04B 39/121* (2013.01); *F04B 35/04* (2013.01); *F04C 23/008* (2013.01); *F04C 29/0085* (2013.01); *H02K 11/0047* (2013.01);  
(Continued)

(58) Field of Classification Search  
USPC ................. 310/68 C, 194; 361/24–25, 30  
See application file for complete search history.

(56) References Cited

U.S. PATENT DOCUMENTS 3,319,096 A * 5/1967 Eberhart et al. ............. 310/68 R  
4,112,405 A * 9/1978 Joseph ......................... 337/4  
(Continued)

FOREIGN PATENT DOCUMENTS

CN 1041427 A 4/1990  
CN 1196600 A 10/1998  
(Continued)

OTHER PUBLICATIONS

International Search Report of PCT/JP2011/072821, date of mailing Nov. 1, 2011, with Form PCT/ISA/237.  
(Continued)

*Primary Examiner* — Burton Mullins  
(74) *Attorney, Agent, or Firm* — Westerman, Hattori, Daniels & Adrian, LLP

(57) ABSTRACT

An object is to provide a hermetic electric compressor that can simplify the installation structure of an internal protector and improve the ease-of-assembly thereof.

In a hermetic electric compressor having a compressor and an electric motor (10) built into a sealed housing (2), the electric motor (10) includes a stator (8) to which plastic insulating bobbins (30) having flanges (30B, 30C) on an inner and outer circumferences of a plurality of tooth parts of a stator core are fitted and around which a stator winding wire (8A) is wound in concentrated winding around the plastic insulating bobbins (30), and an internal protector (29) for electric-motor protection is latched between the inner and outer circumferential flanges (30B, 30C) of the plastic insulating bobbins (30) by being urged against the stator winding wire (8A).

3 Claims, 3 Drawing Sheets

(51) Int. Cl.
*F04B 39/12* (2006.01)
*F04B 35/04* (2006.01)
*F04C 23/00* (2006.01)
*F04C 29/00* (2006.01)
*H02K 3/34* (2006.01)
*F04C 18/02* (2006.01)

(52) U.S. Cl.
CPC ........ *H02K11/0057* (2013.01); *F04C 18/0215* (2013.01); *F04C 2240/40* (2013.01); *H02K 3/34* (2013.01)

(56) References Cited

U.S. PATENT DOCUMENTS

| | | | | |
|---|---|---|---|---|
| 4,503,347 | A | * | 3/1985 | Bergman .................... 310/68 C |
| 5,687,823 | A | * | 11/1997 | Nakagawa et al. ...... 192/84.961 |
| 6,153,954 | A | * | 11/2000 | Uchida et al. .............. 310/68 C |
| 6,326,879 | B1 | * | 12/2001 | Hangmann et al. ........... 337/381 |
| 6,519,833 | B2 | * | 2/2003 | Futami et al. .................... 29/596 |
| 6,595,760 | B2 | * | 7/2003 | Shida et al. ................ 417/410.1 |
| 7,046,495 | B2 | * | 5/2006 | Boischio ....................... 361/104 |
| 8,022,584 | B2 | * | 9/2011 | Heim .......................... 310/68 C |
| 8,022,800 | B2 | * | 9/2011 | Oh et al. ....................... 335/296 |
| 2001/0011854 | A1 | * | 8/2001 | Heyden et al. ................ 310/254 |
| 2009/0140614 | A1 | * | 6/2009 | Heim .............................. 310/68 |

FOREIGN PATENT DOCUMENTS

| | | |
|---|---|---|
| JP | 3-107351 A | 5/1991 |
| JP | 4-168954 A | 6/1992 |
| JP | 9-21385 A | 1/1997 |
| JP | 11-67558 A | 3/1999 |
| JP | 11-332155 A | 11/1999 |
| JP | 2000-224818 A | 8/2000 |
| JP | 2003-83258 A | 3/2003 |
| JP | 2004-301039 A | 10/2004 |
| JP | 2005-146951 A | 6/2005 |

OTHER PUBLICATIONS

Chinese Office Action dated Jul. 31, 2014, issued in corresponding Chinese Patent Application No. 201180026682.8 with English translation (14 pages).

Office Action dated Mar. 23, 2015, issued in corresponding Chinese Patent Application No. 201180026682.8 with English translation (14 pages).

Notification of Grant of Invention of Patent dated Jul. 28, 2015, issued in counterpart Chinese Patent Application No. 201180026682. 8, with English translation (4 pages). Explanation of Relevancy- "The Decision to Grant a Patent has been received."

* cited by examiner

HERMETIC ELECTRIC COMPRESSOR

TECHNICAL FIELD

The present invention relates to a hermetic electric compressor having a compressor and an electric motor configured to drive the compressor built into a sealed housing.

BACKGROUND ART

With DC motors used for hermetic electric compressors, protection against overcurrent and abnormal temperature has been provided on the control side (inverter or software). However, recently, it has been pointed out that protection by software only is insufficient, and there is a tendency for mandatorily installing mechanical protection devices. Therefore, hermetic electric compressors are provided together with mechanical protection devices known as internal protectors. Such an internal protector, as described in, for example, Patent Literature 1, opens a contact of a bi-metal switch by detecting an overcurrent or abnormal temperature when a current or temperature exceeds a reference value and protects the electric motor from fire damage, etc. by interrupting the electric circuit.

In addition, the above-described internal protector, as described in, for example, Patent Literatures 2 and 3, is often installed at an end of a stator of an electric motor. A common procedure has been to fix the internal protector onto the stator winding wire of the electric motor, either directly or covered with an insulating sleeve, by tying it with a tying cord or the like used when forming the stator winding wire.

CITATION LIST

Patent Literature

{PTL 1} Japanese Unexamined Patent Application, Publication No. 2005-146951
{PTL 2} Japanese Unexamined Patent Application, Publication No. 2003-83258
{PTL 3} Japanese Unexamined Patent Application, Publication No. 2004-301039

SUMMARY OF INVENTION

Technical Problem

However, as described above, with a structure in which the internal protector is tied and fixed with a tying cord or the like, the internal protector must be tied onto the stator winding wire during assembly. Thus, there has been a problem of, for example, high production cost due to insufficient ease-of-assembly, as well as the extra workload required.

The present invention has been conceived in light of such circumstances, and it is an object thereof to provide a hermetic electric compressor that can simplify the installation structure of the internal protector and improve the ease-of-assembly.

Solution to Problem

To solve the above-mentioned problem, the hermetic electric compressor according to the present invention employs the following solutions.

Specifically, a hermetic electric compressor according to an aspect of the present invention is a hermetic electric compressor having a compressor and an electric motor configured to drive the compressor built into a sealed housing, wherein the electric motor includes a stator to which plastic insulating bobbins having flanges on an inner and outer circumferences of a plurality of tooth parts of a stator core are fitted and around which a stator winding wire is wound in concentrated winding around the plastic insulating bobbins, and wherein an internal protector for electric-motor protection is latched between the inner and outer circumferential flanges of the plastic insulating bobbins by being urged against the stator winding wire.

According to an aspect of the present invention, in the hermetic electric compressor, the electric motor includes a stator to which plastic insulating bobbins having flanges on the inner and outer circumferences of a plurality of tooth parts of a stator core are fitted and around which a stator winding wire is wound in concentrated winding around the plastic insulating bobbins, and an internal protector for electric-motor protection is latched between the inner and outer circumferential flanges of the plastic insulating bobbins by being urged against the stator winding wire. Thus, the internal protector, which operates in response to an overcurrent or abnormal temperature imposed on the electric motor to interrupt the electric circuit and thereby protect the electric motor, can be urged against the stator winding wire and fixedly installed between the flanges disposed on the inner and outer circumferences using the plastic insulating bobbins used for concentrated winding of the stator winding wire of the electric motor. Consequently, the installation structure of the internal protector can be simplified, improving the ease-of-assembly, and costs can be reduced by reducing the assembly workload.

Moreover, in the hermetic electric compressor according to an aspect of the present invention, on the inner and outer circumferential flanges of the plastic insulating bobbins, hooks for latching the internal protector are disposed, and the internal protector is fitted between the hooks and latched thereto.

According to an aspect of the present invention, on the inner and outer circumferential flanges of the plastic insulating bobbins, hooks for latching the internal protector are disposed, and the internal protector is fitted between the hooks and latched thereto. Thus, by fitting the internal protector between hooks disposed on the inner and outer circumferential flanges of the plastic insulating bobbins and latching it thereto with the hooks, the internal protector can be fixedly installed easily. Consequently, the ease-of-assembly of the internal protector can be improved, and the workload can be reduced, thereby reducing costs.

Furthermore, in the hermetic electric compressor according to an aspect of the present invention, on the inner and outer circumferential flanges of the plastic insulating bobbins, latching holes are provided, and the internal protector is latched between the inner and outer circumferential flanges by means of retainer plates latched to the latching holes.

According to an aspect of the present invention, on the inner and outer circumferential flanges of the plastic insulating bobbins, latching holes are formed, and the internal protector is latched between the inner and outer circumferential flanges by means of retainer plates latched to the latching holes.

Thus, by installing the internal protector between the inner and outer circumferential flanges of the plastic insulating bobbins and urging, from above, the internal protector by latching the retainer plates to the latching holes formed in the inner and outer circumferential flanges, the internal protector can be fixedly installed easily. Consequently, the ease-of-assembly of the internal protector can be improved, and the workload can be reduced, thereby reducing costs.

Advantageous Effects of Invention

According to the present invention, the internal protector, which operates in response to an overcurrent or abnormal temperature imposed on the electric motor to interrupt the circuit and thereby protect the electric motor, can be urged against the stator winding wire and fixedly installed between the flanges disposed on the inner and outer circumferences using the plastic insulating bobbins used for concentrated-winding of the stator winding wire of the electric motor. Consequently, the installation structure of the internal protector can be simplified, improving the ease-of assembly, and costs can be reduced by reducing the assembly workload.

DESCRIPTION OF EMBODIMENTS

Embodiments of the present invention will be described below with reference to the drawings.

First Embodiment

A first embodiment of the present invention will be described below using FIGS. 1 and 2.

Figure 1:
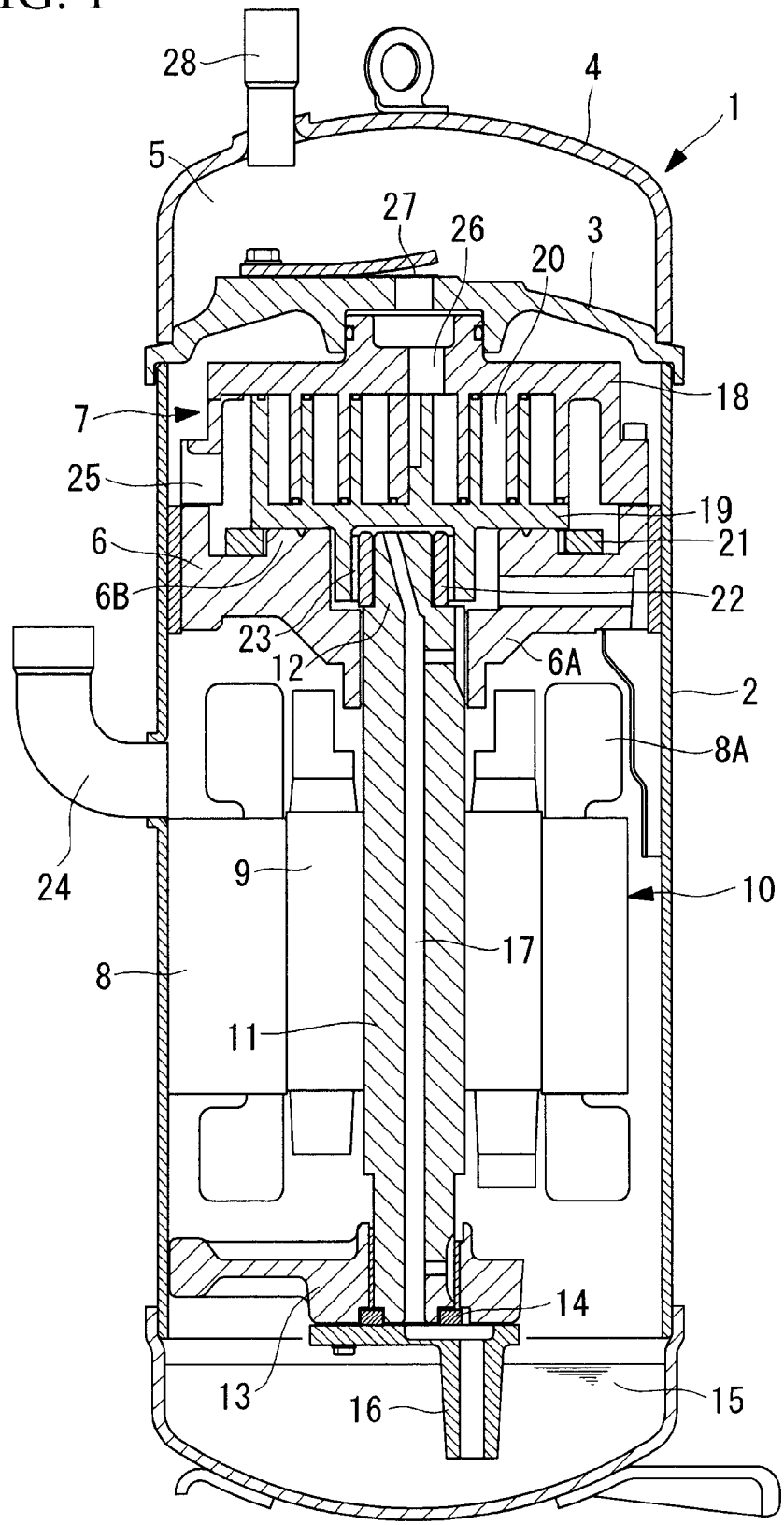
FIG. 1 is a longitudinal sectional view of a hermetic electric compressor according to a first embodiment of the present invention.
Figure 2:
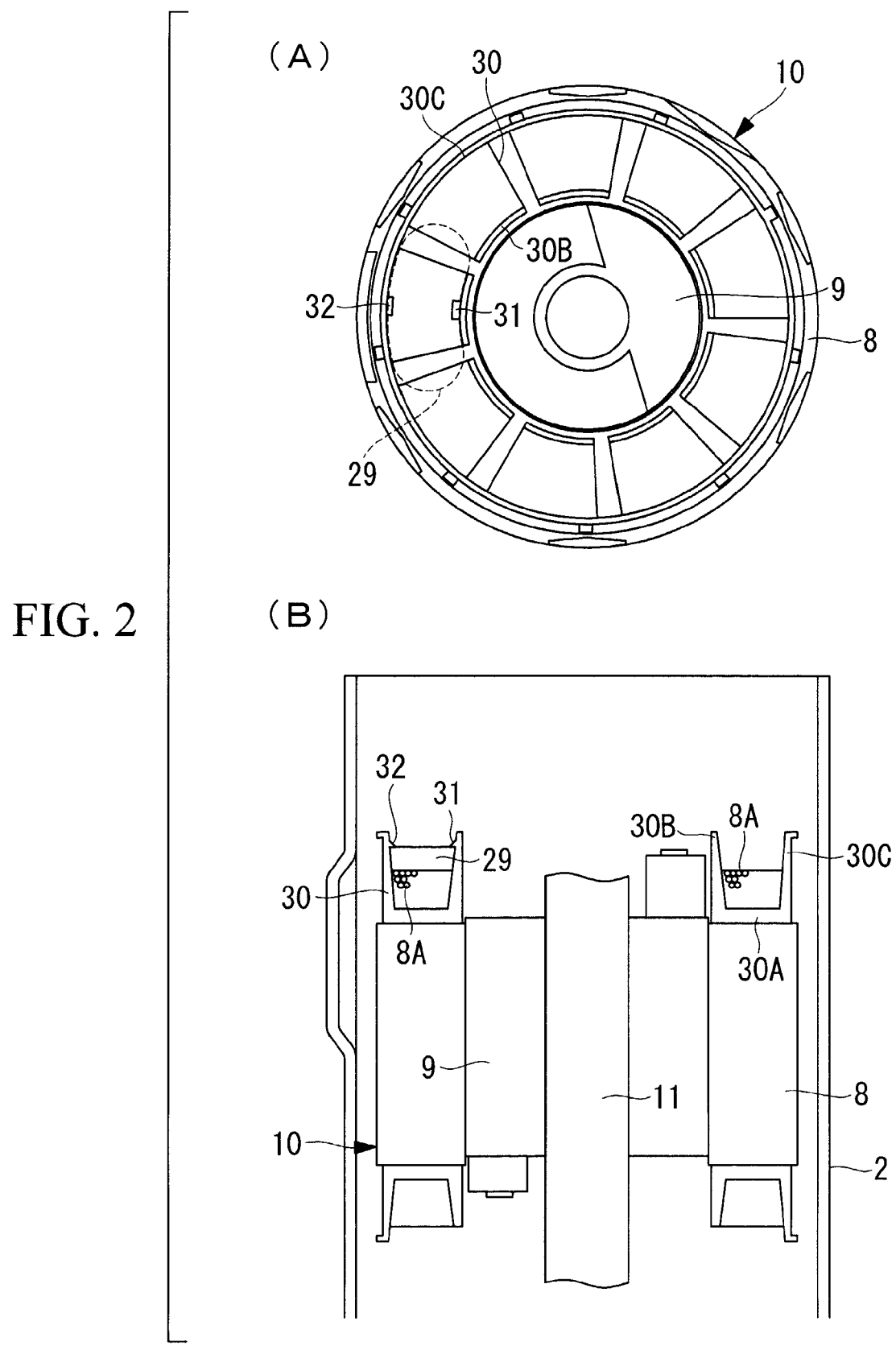
FIG. 2 is a plan view (A) and a longitudinal sectional view (B) of an electric motor built into the hermetic electric compressor shown in FIG. 1.

FIG. 1 shows a longitudinal sectional view of a hermetic electric compressor according to the first embodiment of the present invention, and FIG. 2 shows a plan view (A) and a longitudinal sectional view (B) of an electric motor thereof.

As a hermetic electric compressor 1, here, an example of a hermetic electric scroll compressor 1 is described, but the present invention is not limited thereto.

The hermetic electric scroll compressor 1 includes a vertically-elongated, closed-bottom, cylindrical sealed housing 2 composed of a steel plate. The upper portion of the sealed housing 2 is sealed by a discharge cover 3 and an upper cover 4, and a discharge chamber 5 is formed between the discharge cover 3 and the upper cover 4.

Inside the sealed housing 2, an upper bearing member (frame member) 6 is fixedly installed to an upper region, and a scroll compressor 7 is installed on the upper bearing member 6, while an electric motor 10 constituted of a stator 8 and a rotor 9 is installed in a lower region by fixing the stator 8 to the sealed housing 2. A crank shaft 11 is fixed to the rotor 9 of the electric motor 10; a crank pin 12 whose shaft center is eccentrically shifted by a predetermined amount is disposed at an upper end of the crank shaft 11; and by connecting the crank pin 12 to the scroll compressor 7, it is possible to drive the scroll compressor 7.

As for the crank shaft 11, the upper portion is supported by a journal bearing part 6A of the upper bearing member 6 in a freely rotating manner, and a lower end is supported in a freely rotating manner by a journal lower bearing 13, which is disposed in the lower region of the sealed housing 2. A displacement lubrication pump 14 is disposed between the journal lower bearing 13 and the lower end of the crank shaft 11 and is configured such that a lubricant 15 filling the bottom portion of the sealed housing 2 is taken in through an intake pipe 16 and discharged through a lubrication hole 17 formed through the crank shaft 11 along the axial direction. The lubricant 15 is supplied to required sections, such as the upper bearing member 6, the scroll compressor 7, and the journal lower bearing 13, through the lubrication hole 17.

The scroll compressor 7 has the upper bearing member 6 as one of the structural parts and includes a fixed scroll member 18 that is fixedly installed on the upper bearing member 6; a turning scroll member 19 that is supported by a thrust bearing part 6B of the upper bearing member 6 in a freely sliding manner and constitutes a compression chamber 20 by being engaged with the fixed scroll member 18; an anti-rotation mechanism 21, such as an Oldham ring, that is interposed between the upper bearing member 6 and the turning scroll member 19 to prevent rotation of the turning scroll member 19 while allowing revolving/turning motion; and a drive bush 22 and a turning bearing (needle bearing) 23 that are disposed between the crank pin 12 of the crank shaft 11 and a backside boss of the turning scroll member 19 and transmit the rotating force of the crank shaft 11 to the turning scroll member 19. The end-plate center portion of the fixed scroll member 18 is installed on the upper bearing member 6 while being connected to the discharge cover 3.

The above-described scroll compressor 7 takes in refrigerant gas taken into the sealed housing 2 (low-pressure housing) through an intake pipe 24 from an intake port 25 formed in the sealed housing 2 into the compression chamber 20 and compresses it to high-temperature, high-pressure gas. The compressed gas is discharged into the discharge chamber 5 through a discharge port 26 disposed at the center portion of the fixed scroll member 18 and a discharge valve 27 disposed in the discharge cover 3 and is then sent outside the compressor through a discharge pipe 28 connected to the discharge chamber 5.

To prevent fire damage, etc. of the electric motor 10 during overload operation of the hermetic electric compressor 1, an internal protector 29 for electric-motor protection is installed in the stator 8 of the electric motor 10, as illustrated in FIG. 2. The internal protector 29 is a known protection device that is installed in a conductive circuit of the electric motor 10 and interrupts the circuit in an emergency by operating in response to the current and temperature, and, for example, a known internal protector can be used, having a configuration including a bi-metal switch that detects the current value and ambient temperature and, when these exceed reference values (thresholds), opens a contact to interrupt the circuit.

The internal protector 29 is fixedly installed using insulating bobbins 30 constituting the stator 8 of the electric motor 10. The insulating bobbins 30, which are used for forming the windings (coil formation) of the stator 8, as known in the art, are fitted onto a plurality of tooth parts (pole teeth) radially disposed on the stator core side, a stator winding wire 8A is wound around the insulating bobbins 30 using concentrated winding, and the insulating bobbins 30 are each configured to include a wound part 30A around which the stator winding wire 8A is wound, an inner circumferential flange 30B in contact with a pole core of the stator core, and an outer circumferential flange 30C in contact with a yoke core.

The insulating bobbins 30 are composed of plastic, and a plastic material such as fiberglass-reinforced composite PBT plastic (polybutylene terephthalate), PPS plastic (polyphenylene sulfide), or LCP plastic (liquid crystal polymer) can be used. On the inner circumferential flange 30B and the outer circumferential flange 30C of each plastic insulating bobbin 30, paired hooks 31 and 32 that correspond to the regions to which the internal protector 29 is fixedly installed are disposed and are configured such that, by fitting the internal protector 29 between the hooks 31 and 32, the internal protector 29 is urged against the stator winding wire 8A and is latched thereto.

Accordingly, the following advantageous effects are achieved by this embodiment.

While the hermetic electric compressor 1 is operating, for example, in an overload operation state, if an overcurrent flows through the electric motor 10 and/or the ambient temperature reaches an abnormally high temperature, causing these to exceed reference values (thresholds), the electric motor 10 can be protected from fire damage, etc. by operating the internal protector 29 and interrupting the circuit by opening the contact of the bi-metal switch. By doing so, not only can the electric motor 10 be protected by the control system through software but also a highly reliable protection mechanism can be constituted when combined with the internal protector 29, which is a mechanical protection device.

Furthermore, for installing the internal protector 29 in the stator 8 of the electric motor 10, the plastic insulating bobbins 30 used for concentrated winding of the stator winding wire 8A of the electric motor 10 are used, and the internal protector 29 is latched between the flanges 30B and 30C disposed on the inner and outer circumferences and is fixedly installed thereon by being urged against the stator winding wire 8A.

Thus, the installation structure of the internal protector 29 can be simplified, and the ease-of-assembly can be significantly improved compared with known methods using tying cords or the like, and also, a significant cost reduction due to the decreased assembly workload can be expected.

In addition, to latch the internal protector 29 between the inner and outer circumferential flanges 30B and 30C of the plastic insulating bobbins 30, the paired hooks 31 and 32 are provided, and the internal protector 29 is latched thereto by fitting it between the hooks 31 and 32. Consequently, by simply fitting the internal protector 29 between the hooks 31 and 32 disposed on the inner and outer circumferential flanges 30B and 30C of the plastic insulating bobbins 30, the internal protector 29 can be fixedly installed easily, thus improving the ease-of-assembly of the internal protector 29 and reducing the workload, thereby reducing costs.

Second Embodiment

Figure 3:
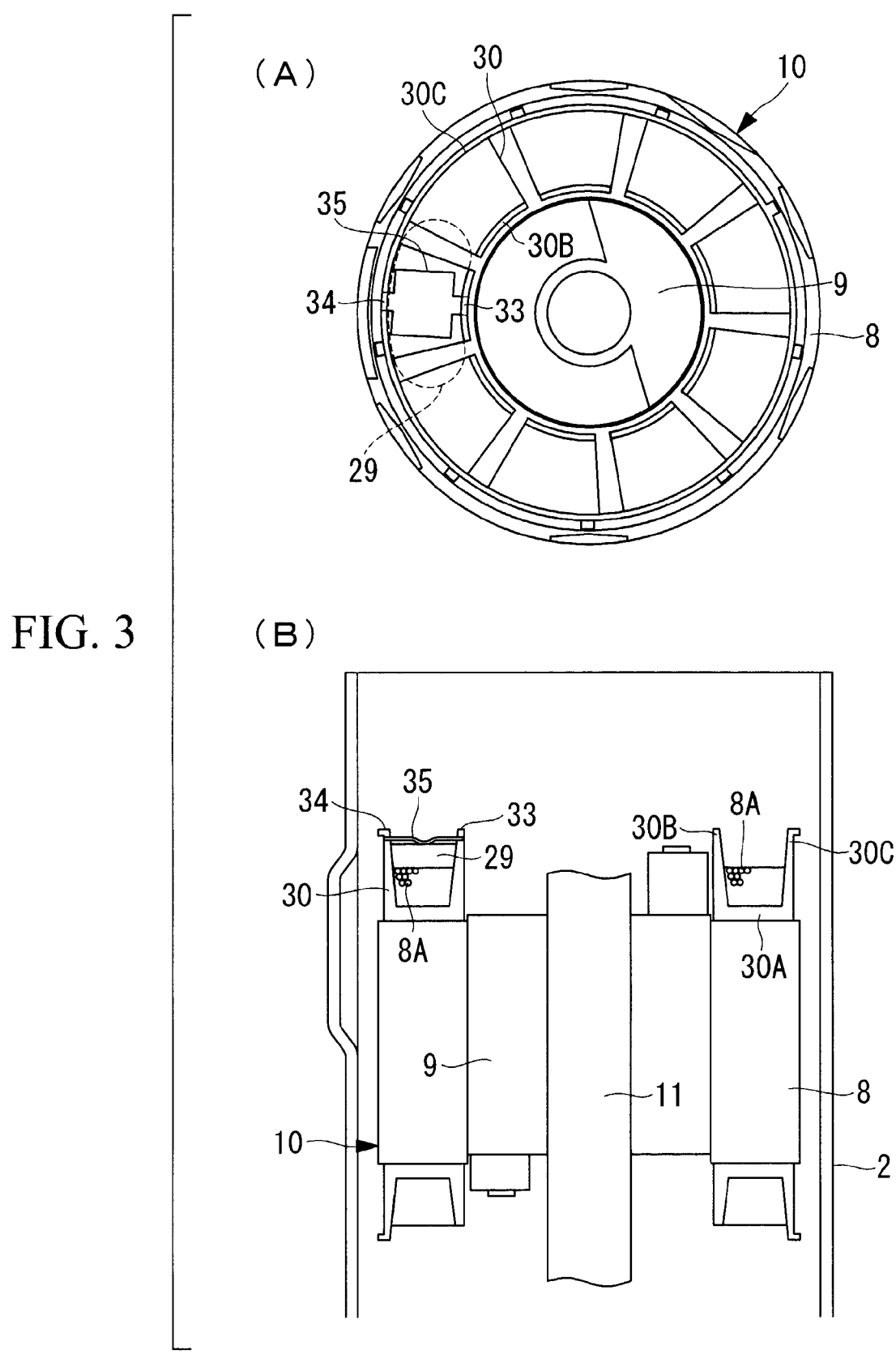
FIG. 3 is a plan view (A) and a longitudinal sectional view (B) of an electric motor built into a hermetic electric compressor according to a second embodiment of the present invention.

Next, a second embodiment of the present invention will be described using FIG. 3.

In this embodiment, compared with the above-described first embodiment, the latching structure of the internal protector 29 differs. Since other points are similar to the first embodiment, descriptions thereof are omitted.

In this embodiment, instead of disposing the paired hooks 31 and 32 on the inner and outer circumferential flanges 30B and 30C of the plastic insulating bobbins 30, paired latching holes 33 and 34 are formed, and the configuration is such that the internal protector 29 is latched by being urged against the stator winding wire 8A between the inner and outer circumferential flanges 30B and 30C of the plastic insulating bobbins 30 by means of retainer plates 35 latched to the latching holes 33 and 34.

Through a configuration like that described above, by installing the internal protector 29 between the inner and outer circumferential flanges 30B and 30C of the plastic insulating bobbins 30 and urging, from above, the internal protector 29 by latching the retainer plates 35 to the paired latching holes 33 and 34 formed in the inner and outer circumferential flanges 30B and 30C, the internal protector 29 can be fixedly installed easily. Consequently, in this embodiment too, similar to the first embodiment, the ease-of-assembly of the internal protector 29 can be improved, and the workload can be reduced, thereby reducing costs.

The present invention is not limited to the invention associated with the above-described embodiments, and appropriate modifications are possible without departing from the spirit thereof. For example, in the above-described embodiment, an example in which the hermetic electric scroll compressor 1 is applied has been described; however, the type of compressor is not limited to a scroll compressor, and it is obvious that it can be similarly applied to various types of compressors, such as a rotary compressor.

In addition, the internal protector 29 may have any configuration so long as it operates in response to at least the current and temperature to protect the electric motor 10. Similarly, the plastic insulating bobbins 30 are not limited to plastic insulating bobbins having the shapes and materials exemplified in the above-described embodiments, and obviously, various modifications are possible.

REFERENCE SIGNS LIST 1 hermetic electric compressor (hermetic electric scroll compressor)
2 sealed housing
7 scroll compressor
8 stator
8A stator winding wire
9 rotor
10 electric motor
29 internal protector
30 insulating bobbin (plastic insulating bobbin)
30B inner circumferential flange
30C outer circumferential flange
31, 32 hook
33, 34 latching hole
35 retainer plate

The invention claimed is:

1. A hermetic electric compressor comprising:
a compressor configured to be housed in a sealed housing; and
an electric motor configured to drive the compressor and to be housed in the sealed housing,
wherein the electric motor includes a stator to which plastic insulating bobbins having flanges on an inner and outer circumferences of a plurality of tooth parts of a stator core are fitted and around which a stator winding wire is wound in concentrated winding around the plastic insulating bobbins, and
wherein an internal protector for electric-motor protection is urged directly against the stator winding wire and is latched between the inner and outer circumferential flanges of the plastic insulating bobbins.

2. The hermetic electric compressor according to claim 1, wherein, on the inner and outer circumferential flanges of the plastic insulating bobbins, hooks for latching the internal protector are disposed, and the internal protector is fitted between the hooks and latched thereto.

3. The hermetic electric compressor according to claim 1, wherein, on the inner and outer circumferential flanges of the plastic insulating bobbins, latching holes are provided, and the internal protector is latched between the inner and outer circumferential flanges with retainer plates latched to the latching holes.

* * * * *